United States Patent [19]

Takayama

[11] 4,245,905
[45] Jan. 20, 1981

[54] BLADE ACTUATING DEVICE FOR FOCAL PLANE SHUTTERS

[75] Inventor: Masao Takayama, Shirai, Japan

[73] Assignee: Copal Company Limited, Tokyo, Japan

[21] Appl. No.: 105,300

[22] Filed: Dec. 19, 1979

[30] Foreign Application Priority Data

Dec. 27, 1978 [JP] Japan ................. 53/163317
Jun. 29, 1979 [JP] Japan ............... 54/89220[U]

[51] Int. Cl.³ .................................................. G03B 9/40
[52] U.S. Cl. .................................................... 354/246
[58] Field of Search ............... 354/246, 247, 248, 249

[56] References Cited

U.S. PATENT DOCUMENTS

| | | |
|---|---|---|
| 3,825,940 | 7/1974 | Hayami ................. 354/246 |
| 3,999,196 | 12/1976 | Inoue ................. 354/246 X |
| 4,054,891 | 10/1977 | Onda et al. ................. 354/246 |
| 4,110,772 | 8/1978 | Nakagawa et al. ................. 354/246 |
| 4,114,174 | 9/1978 | Onda et al. ................. 354/249 |
| 4,145,132 | 3/1979 | Onda et al. ................. 354/249 |

*Primary Examiner*—Donald Griffin
*Attorney, Agent, or Firm*—Cushman, Darby & Cushman

[57] ABSTRACT

A focal plane shutter comprising a front blade operating arm, a front blade driving arm, a single front blade driving spring stretched between both of these arms, a rear blade operating arm, a rear blade driving arm and a single rear blade driving spring stretched between both of these arms, not only the front blade group but also the rear blade group being moved to an exposure aperture covering position after the end of an exposing operation to simplify the structure of a blade actuating device. Both of these driving springs are so arranged as to be able to make the driving force acting on the driving arm stronger than on the operating arm.

6 Claims, 11 Drawing Figures

FIG. 3A
FIG. 3B
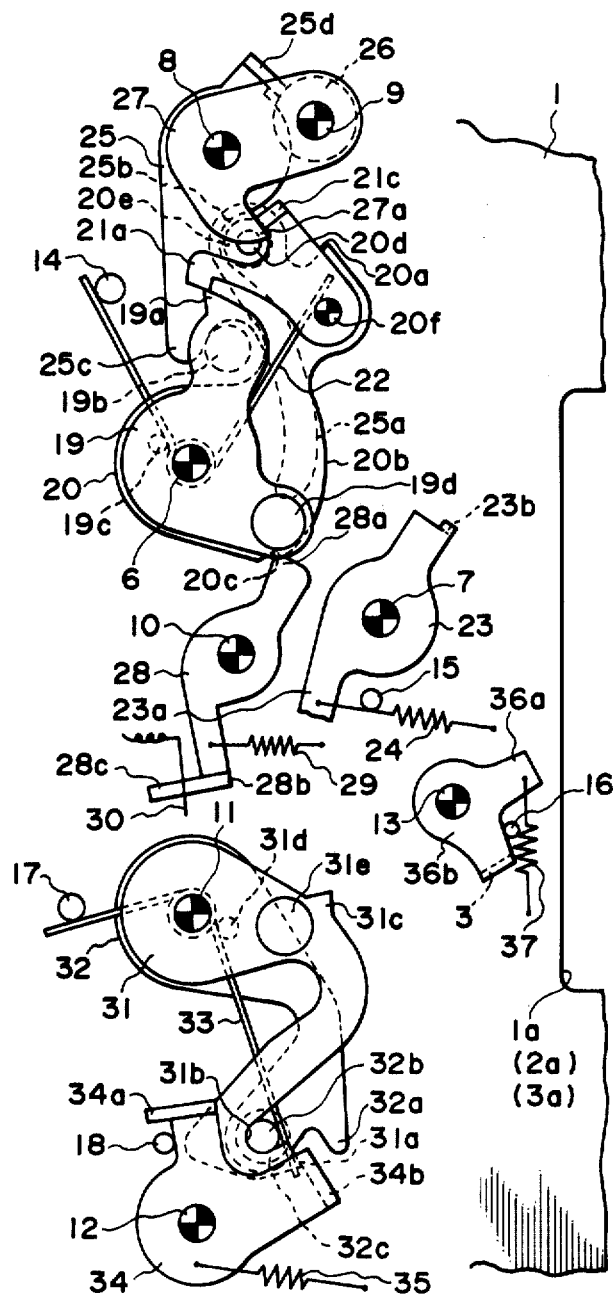
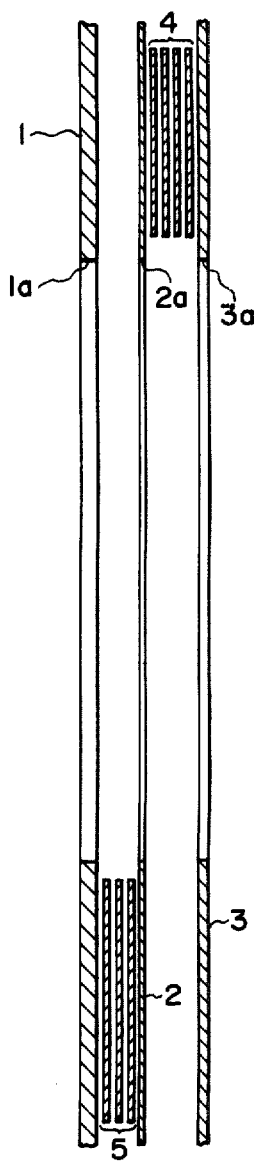

BLADE ACTUATING DEVICE FOR FOCAL PLANE SHUTTERS

BACKGROUND OF THE INVENTION (a) Field of the Invention

This invention relates to a focal plane shutter wherein each of a front blade group and rear blade group consists of a plurality of opaque laminae so as to make an exposure when each blade group runs in the vertical direction and more particularly to a focal plane shutter of a type wherein a front blade group and rear blade group are maintained in an exposure aperture covering position except when they move to make an exposure.

(b) Description of the Prior Art

A focal plane shutter of this type has been developed for the purpose of preventing light from leaking on a film and reducing the height of a camera and has been already practiced. Generally, in this type of focal plane shutter, a pair of a blade driving member and blade operating member are provided so that the opening and closing motion of each of the front blade group and rear blade group may be shared by the driving member and operating member. Therefore, these driving member and operating member must be biased in the directions opposite to each other. According to a conventional mechanism, the driving member and operating member are biased by respective independent springs and therefore there has been a defect that the formation is complicated.

SUMMARY OF THE INVENTION

Therefore, a primary object of the present invention is to provide a focal plane shutter of this type arranged so as to be able to bias a driving member and operating member in the directions opposite to each other with one spring to eliminate the above mentioned defect.

Another object of the present invention is to provide a focal plane shutter of this type wherein a spring washer when the rear blade group moves from the closed position to the opened position than when it moves from the opened position to the closed position is made to act to prevent a bad influence on the shutter opening operation.

These and other objects of the present invention will become more apparent during the course of the following detailed description and appended claims.

BRIEF DESCRIPTION OF THE DRAWINGS

FIG. 3A is a plane view showing a fully opened state of the embodiment in FIG. 1A;

FIG. 3B is a sectional view showing an overlapped state of the front blade group and rear blade group corresponding to FIG. 3A;

DESCRIPTION OF THE PREFERRED EMBODIMENTS

Figure 1A:
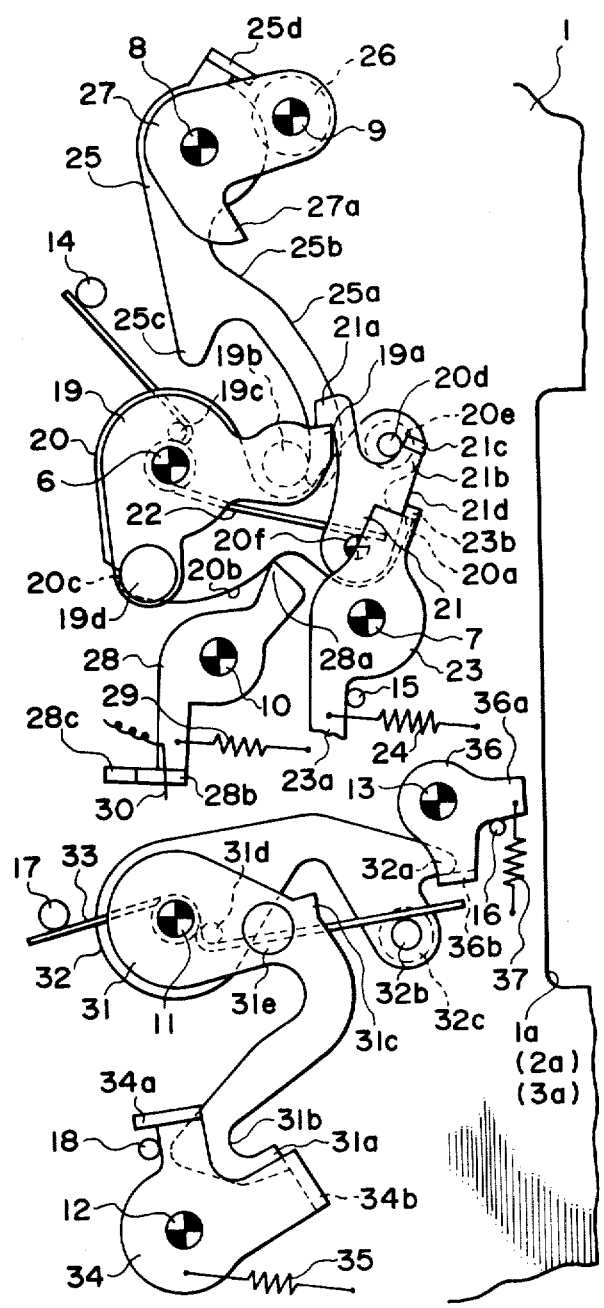
FIG. 1A is a plan view showing a cocked state of an embodiment of a blade opening and closing mechanism of a focal plane shutter according to the present invention.
Figure 1B:
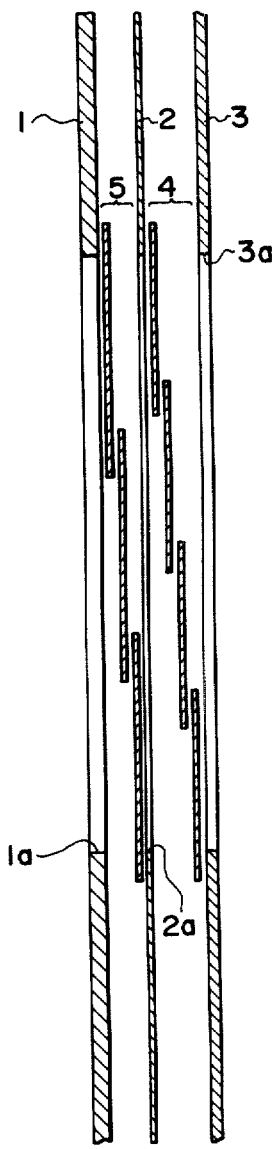
FIG. 1B is a sectional view showing an overlapped state of a front blade group and rear blade group corresponding to FIG. 1A.
Figure 2A:
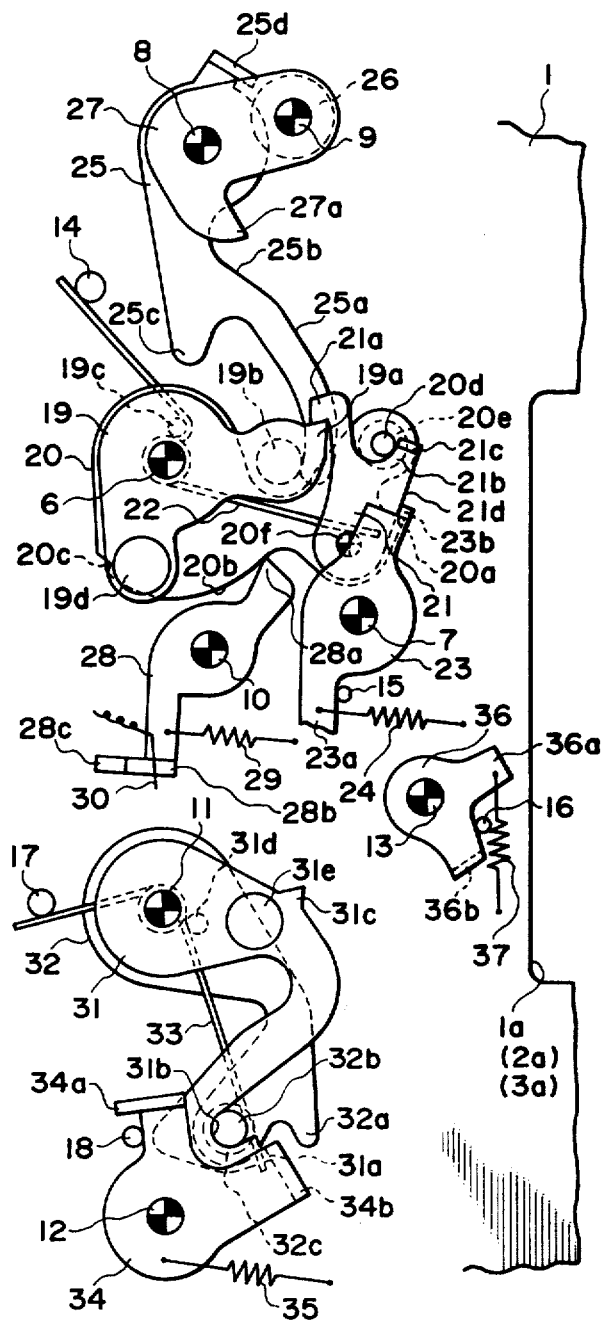
FIG. 2A is a plan view showing an intermediate operation of the embodiment of FIG. 1A.
Figure 2B:
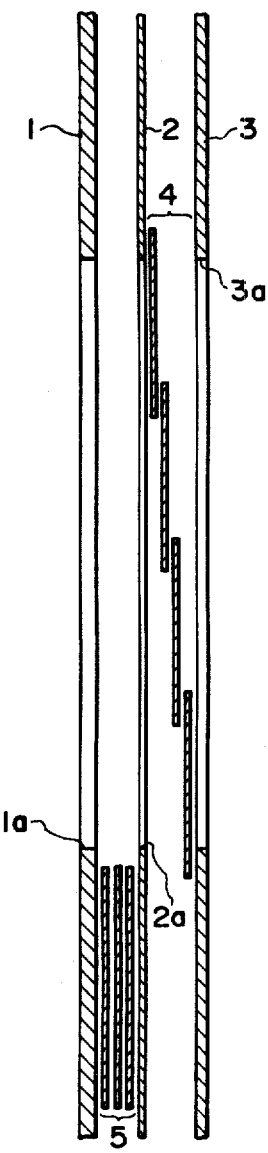
FIG. 2B is a sectional view showing an overlapped state of the front blade group and rear blade corresponding to FIG. 2A.
Figure 4A:
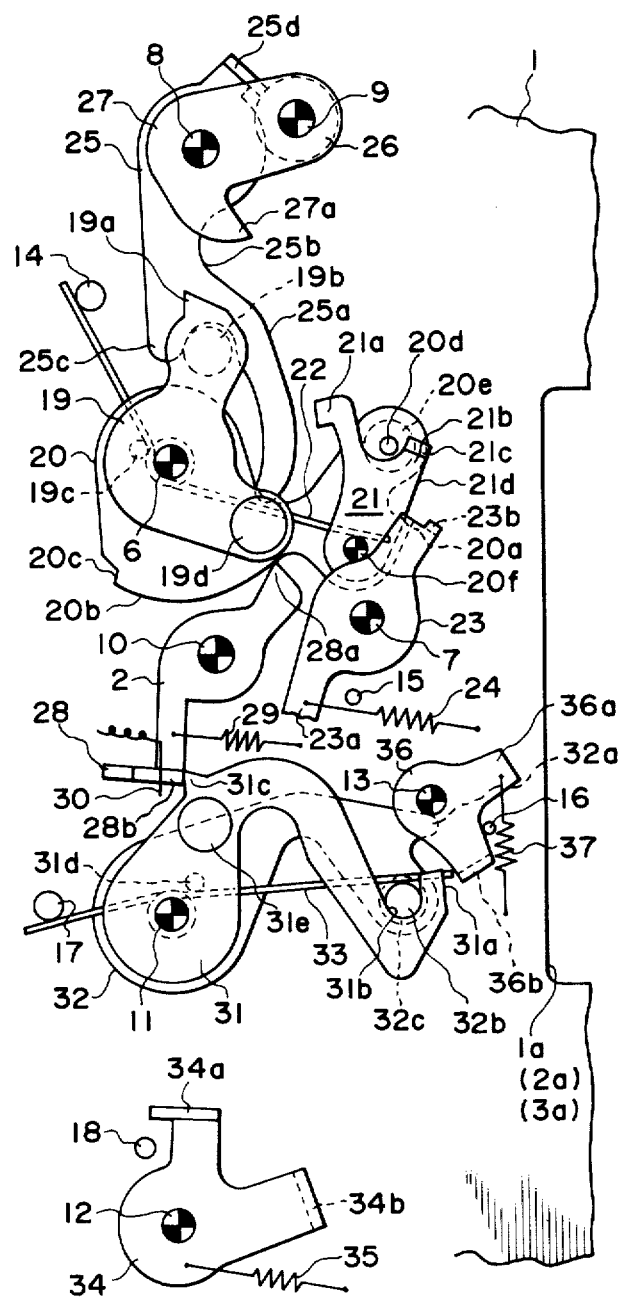
FIG. 4A is a plan view showing an uncocked state of the embodiment in FIG. 1A.
Figure 4B:
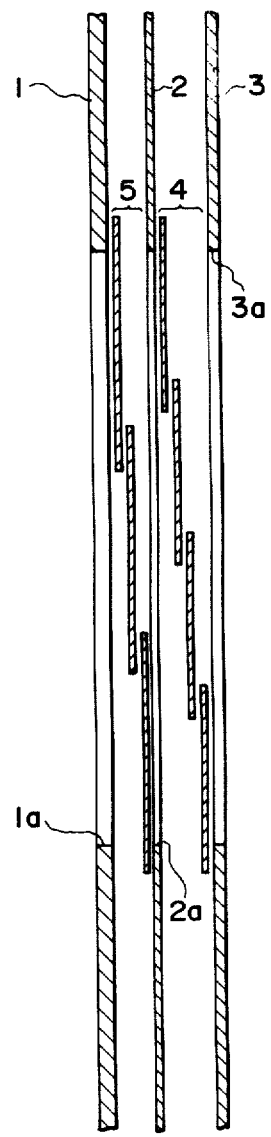
FIG. 4B is a sectional view showing an overlapped state of the front blade group and rear blade group corresponding to FIG. 4A.

First of all, in FIGS. 1A to 4B, reference numeral 1 denotes a shutter plate forming an exposure aperture 1a, 2 denotes an intermediate plate which forms an exposure aperture 2a aligned with the exposure aperture 1a, 3 denotes a cover plate which forms an exposure aperture 3a aligned with the exposure apertures 1a and 2a, 4 denotes a front blade group which consists of a plurality of opaque laminae and is arranged in a space defined by the intermediate plate 2 and cover plate 3, and 5 denotes a rear blade group which consists of a plurality of opaque laminae and is arranged in a space defined by the shutter plate 1 and intermediate plate 2. Reference numerals 6 to 13 and 14 to 18 denote shafts and pins erected on the shutter plate 1. 19 denotes a front blade driving arm which is pivoted to the shaft 6, forms an arm 19a and has pins 19b and 19c erected on the back side and a pin 19d erected on the front side. 20 denotes a front blade operating arm which is pivoted to the shaft 6, forms a hook 20a, peripheral surface 20b and step part 20c, has a pin 20d erected on the front surface and a pin 20e erected on the back side and further has a supporting shaft 20f erected thereon. 21 denotes a connecting lever which is pivoted to said supporting shaft 20f and forms a hook 21a engageable with the arm 19a of the front blade driving arm 19, an arm 21b engageable with the pin 20d of the front blade operating arm 20, a bend 21c and a side 21d. 22 denotes a driving spring which is hung on the fixing pin 14, pin 19c, shaft 6 and pin 20f and acts to clockwise bias the front blade operating arm 20 and to counterclockwise bias the front blade driving arm 19. 23 denotes an opening release lever which is pivoted to the shaft 7, forms an arm 23a and a bend 23b engageable with the hook 20a of the front blade operating arm 20 and with the side 21d of the connecting lever 21, is counterclockwise biased by a spring 24 and is prevented by the pin 15 from being counterclockwise rotated. 25 denotes a brake lever which is pivoted to the shaft 8 and forms a side 25a with which the pin 20e of the front blade operating arm 20 can engage, a recess 25b, a projection 25c with which the pin 19b of the front blade driving arm 19 can engage and a bend 25d. 26 denotes a flexible member which is supported by the shaft 9 and to which the bend 25d can contact. 27 denotes a releasing plate which is fixed on the shutter plate 1 by the shafts 8 and 9 and forms an arm 27a with which the bend 21c of the connecting lever 21 can engage. 28 denotes an X contact lever which is pivoted to the shaft 10, forms an arm 28a engageable with the peripheral surface 20b and step part 20c of the front blade operating lever 20, a bend 28b and protrusion 28c and is counterclockwise biased by a spring 29. 30 denotes an X contact which is so arranged as to be engageable with the protrusion 26c of the X contact lever 28. 31 denotes a rear blade driving arm which is pivoted to the shaft 11, forms an arm 31a, recess 31b and projection 31c able to push and move the bend 28b of the X contact lever 28 and has a pin 31d erected on the back side and a pin 31e erected on the front side. 32 denotes a rear blade operating arm which is pivoted to the shaft 11, forms an arm 32a, has a pin 32b engageable with the recess 31b on the front side and a pin 32c erected on the back side. 33 denotes a driving spring which is hung on the fixing pin 17, shaft 11, pin 31d and 32b and biases the rear blade operating arm 32 clockwise and the rear blade driving arm 31 counterclockwise. 34 denotes a closing release arm lever which is pivoted to the shaft 12, forms a bend 34a and a bend 34b engageable with the arm 31a of the rear blade driving arm 31, is conterclockwise biased by a spring 35 and is prevented by the pin 18 from being counterclockwise rotated. 36 denotes a locking lever which is pivoted to the shaft 13, forms an arm 36a and a bend 36b engageable with the arm 32b of the rear blade operating arm 32, is clockwise biased by a spring 37 and is prevented by the pin 16 from being clockwise rotated. By the way, the pin 20e of the front blade operating arm 20 and the pin 32c of the rear blade operating arm 32 are connected respectively to the respective blade supporting members of the front blade group 4 and rear blade group 5 through arcuate slots not illustrated respectively in the shutter plate 1 (and intermediate plate 2).

The operation is as follows. When a releasing operation is made from the cocked state in FIG. 1A, a well known automatic diaphragm mechanism and mirror mechanism not illustrated will operate and then subsequently a control member not illustrated will be released. By the initial operation of this control member, the arm 36a will be pushed and moved, the locking lever 36 will be rotated counterclockwise against the tension of the spring 37 and the bend 36b will be disengaged from the arm 32a. As a result, the rear blade operating arm 32 will be rotated clockwise by the tension of the spring 33 to a position in which the pin 32b engages with the recess 31b of the rear blade driving arm 31. Thereby, the state in FIG. 2A will be made and the rear blade group 5 will be returned together with the front blade group 4 to the cocked position (FIG. 2B) in which the exposure aperture is opened from the state (FIG. 1B) in which the exposure aperture is closed. Then, in the final stage of the motion of the above mentioned control member, the arm 23a will be pushed and moved, the opening release lever 23 will be rotated clockwise against the tension of the spring 24 and the bend 23b will be disengaged from the hook 20a. By this unlocking operation, the front blade driving arm 19 and front blade operating arm 20 which are connected with each other through the connecting lever 21 will be integrally rotated counterclockwise by the tension of the spring 22. In this counterclockwise rotation, first the front blade operating arm 20 will be braked while the pin 20e engages with the side 25a of the brake lever 25 and rotates the brake lever 25 clockwise and the front blade driving arm 19 will be subjected to a strong braking force by the touch of the pin 19b with the projection 25c at the time when the bend 25d touches the flexible member 26 in the final stage of its counterclockwise rotation. On the other hand, before the final stage of the counterclockwise rotation of the front blade operating arm 20, the connecting lever 21 will be rotated clockwise by the engagement of the bend 21c with the arm 27a of the releasing plate 27 and the hook 21 will be disengaged from the arm 19a of the front blade driving arm 19. At this time, the front blade operating arm 20 will be further rotated counterclockwise by the inertia and will be braked by the touch of the pin 20e with the recess 25b of the brake lever 25 and then will be rotated clockwise by the tension of the spring 22. Further, in the counterclockwise rotation of the front blade operating arm 20, just before the hook 21a of the connecting lever 21 disengages from the arm 19a of the front blade driving arm 19, the step part 20c of the front blade operating arm 20 will be opposed to the arm 28a, therefore the X contact lever 28 will be counterclockwise rotated by the tension of the spring 29, said arm 28a will advance into the step part 20c and will be stopped in the counterclockwise rotated position without bounding the clockwise rotating motion of the front blade operating arm 20 and, at the same time, the protrusion 28c will press the X contact 30. As a result, the front blade group 4 having opened the exposure aperture with the counterclockwise rotation of the front blade operating arm 20 will be held in the opened state and all will be in the state shown in FIGS. 3A and 3B.

Thereafter, when a proper exposure time elapses, by a known means, the bend 34a will be pushed and moved, the closing release lever 34 will be clockwise rotated against the tension of the spring 35 and the bend 34b will disengage from the arm 31a. Therefore, by the engagement of the pin 32b with the recess 31b, the rear blade driving arm 31 will be rotated counterclockwise by the tension of the spring 33 together with the rear blade operating arm 32 and the rear blade group 5 will be moved to the exposure aperture closing position. Further, in the final stage of the counterclockwise rotation of the rear blade driving arm 31, the projection 31c will push and move the bend 28b, therefore the X contact lever 28 will be clockwise rotated against the tension of the spring 29, the pressing of the X contact 30 by the protrusion 28c will be released and the arm 28a will escape out of the step part 20c. Therefore, the front blade operating arm 20 will be rotated clockwise by the tension of the spring 22 and the front blade group 4 will be moved to the exposure aperture closing position. As a result, the exposure aperture will be covered doubly by the rear blade group 5 and front blade group 4. By the above operation, all will be in the state in FIGS. 4A and 4B and one exposure operation will end.

The cocking operation will be made when, by a cocking member not illustrated, the above described control member holding the opening release lever 23 as clockwise rotated and the locking lever 36 as counterclockwise rotated and the member holding the closing release lever 34 as clockwise rotated are respectively retreated and the front blade driving arm 19 and rear blade driving arm 31 are clockwise rotated respectively against the tensions of the springs 22 and 33 by operating the pins 19c and 31c. That is to say, first the opening release lever 23 will be counterclockwise rotated by the tension of the spring 24, the bend 23b will be present within the locus of the hook 20a of the front blade oeprating arm 20 and will push and move the side 21d to counterclockwise rotate the connecting lever 21 to the position in which the arm 21b touches the pin 20d and the hook 21a will be present within the locus of the arm 19a of the front blade driving arm 19. The locking lever 36 will be rotated clockwise by the tension of the spring 37 and the bend 36b will be present within the locus of the arm 32a of the rear blade operating arm 32. Further, the closing release lever 34 will be rotated counterclockwise by the tension of the spring 35 and the bend 34b will be present within the locus of the arm 31a in the rear blade driving arm 31. In the final stage of the cocking operation, the arm 19a will once clockwise rotate the connecting lever 21 (and opening release lever 23) to engage the front blade driving arm 19 with the hook 21a. On the other hand, in the initial stage of the cocking operation, the rear blade driving arm 31 will accompany the rear blade operating arm 32 through the spring 33, after said operating arm 32 is locked, the arm 31 will alone continue the clockwise rotation and, in the final stage of the cocking operation, the arm 31a will once clockwise rotate the closing release lever 34 and will engage with the bend 34b. As a result, the exposure aperture will be held as covered doubly with the front blade group 4 and rear blade group 5 and all the elements will return to the state in FIGS. 1A and 1B.

The above explained embodiment is so made that, after the exposure operation, the front blade group 4 may cover the entire aperture. However, it can be so modified that the front blade group 4 may cover a part of the aperture after the exposure operation and the entire aperture in the course of the cocking operation.

Figure 5:
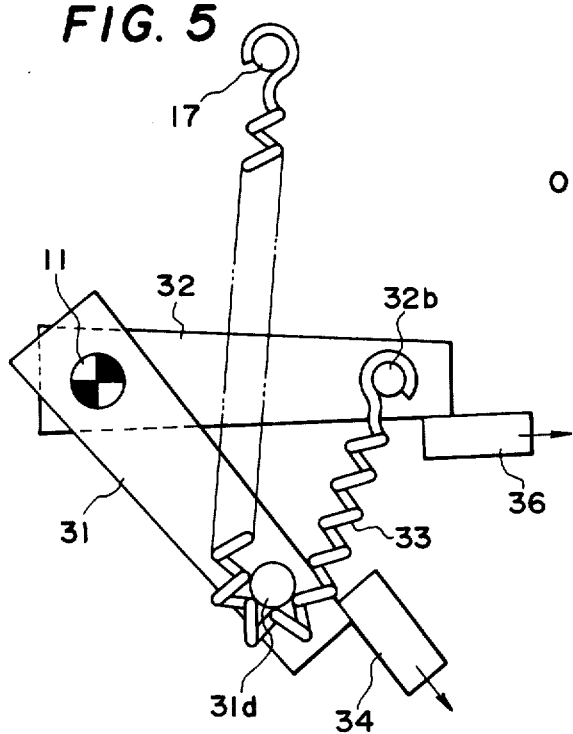
FIG. 5 is an explanatory view showing another embodiment of the present invention.
Figure 7:
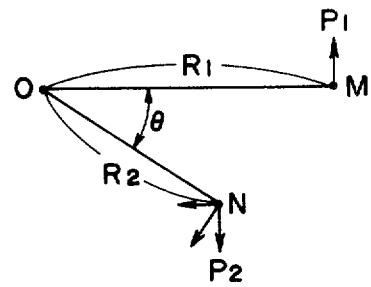
FIG. 7 is an explanatory view showing an acting state of the spring in FIG. 6.

A different method of connecting the driving spring for the driving arm with the above mentioned operating arm shall be explained in the following with reference to FIG. 5. In this embodiment, this connecting method as applied to the rear blade driving means is shown in a very primitive form. Therefore, here the same reference numerals are attached to the substantially same parts as the parts in the already explained embodiment. In this embodiment, the spring 33 is coil-shaped, is connected at one end to the fixing pin 17 and at the other end to the pin 32b and is hung in the intermediate part on the pin 31d. Therefore, in the final stage of the shutter releasing operation, when the locking lever 36 is moved in the direction indicated by the arrow, the rear blade operating arm 32 will be rotated clockwise by the tension of the spring 33, will move the rear blade group to the aperture opening position and will come to engage with the rear blade driving arm 31. Thereafter, when the closing release lever 34 is moved in the direction indicated by the arrow, the rear blade driving arm 31 will be counterclockwise rotated together with the rear blade operating arm 32 by the tension of the spring 33 and will move the rear blade group to the aperture closing position. It is needless to say that this spring connecting method can be applied also to the front blade driving means.

Figure 6:
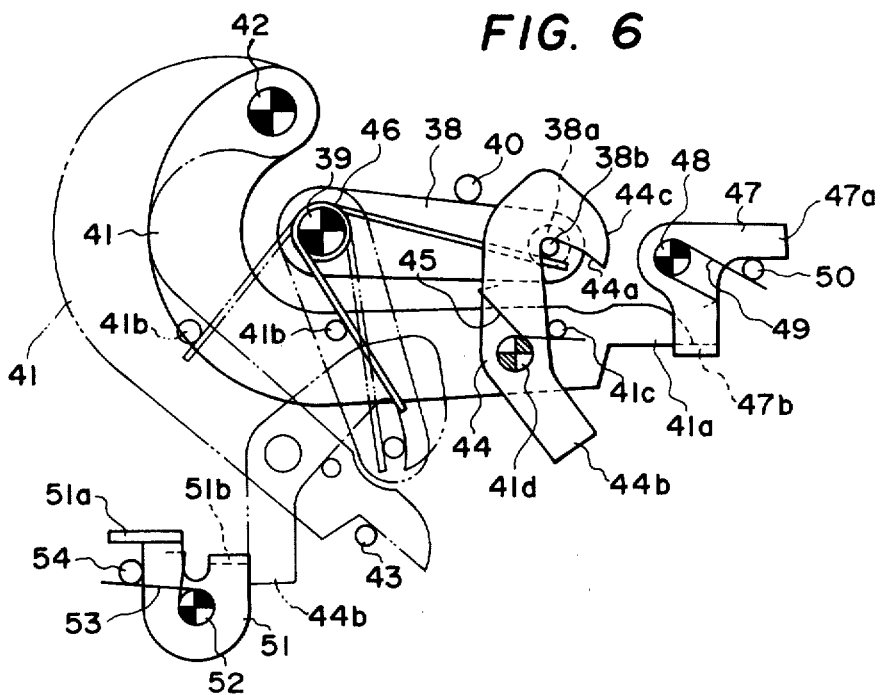
FIG. 6 is an explanatory view showing still another embodiment of the present invention.

Still another embodiment of the present invention is shown in FIG. 6. In this embodiment, too, only the rear blade driving means is shown. In the drawing, reference numeral 38 denotes a rear blade driving arm which is pivoted to a shaft 39 erected on the shutter plate and has a pin 38a on the back side and a pin 38b on the front side. 40 denotes a stopper pin for preventing the rear blade driving arm from rotating counterclockwise. By the way, the pin 38a passes through the shutter plate 1 and is connected to the blade supporting member for the rear blade group 5 arranged on the back side of the plate. Further, the rear blade group 5 is developed in the position of covering the apertures 1a, 2a and 3a in the illustrated state in which said driving arm 38 is in contact with the pin 40. Reference numeral 41 denotes a rear blade operating arm which is pivoted to a shaft 42 erected on the shutter plate 1, forms an arm part 41a and has pins 41b and 41c. 43 denotes a stopper pin for preventing said operating arm 41 from rotating counterclockwise. 44 denotes a rocking lever which is pivoted to a supporting shaft 41d on said operating arm 41, is biased clockwise by a spring 45 hung between it and the pin 41c and forms a hook 44a engageable with the pin 38b of the above mentioned driving arm 38, an arm part 44b and cam surface 44c. 46 denotes a driving spring which is wound on the shaft 39, is hung at one end on the pin 38b of the driving arm 38 and at the other end on the pin 41 of the operating arm 41. 47 denotes a locking lever which is pivoted to a shaft 48 erected on the shutter plate 1, is clockwise biased by a spring 49 and forms an arm part 47a and a bend 47b engageable with the arm part 41a of the operating arm 41. 50 denotes a stopper for preventing the locking lever 47 from being rotated clockwise. 51 denotes a closing release lever which is pivoted to a shaft 52 erected on the shutter plate 1, is counterclockwise biased by a spring 53 and forms a bend 51a and a bend 51b able to push and move the arm part 44b of the above mentioned rocking lever 44. 54 denotes a stopper for preventing the closing release lever 51 from being rotated counterclockwise.

Here, if the center point of the shaft 39 of the driving arm 38 is represented by O, the acting point of said arm 38 and rocking lever 44 is represented by M, the acting point of the spring 46 and operating arm 41 is represented by N, $OM = R_1$, $ON = R_2$, $\angle MON = \theta$, the torque is represented by T, the reaction at the point M tending to counterclockwise rotate the driving arm 38 is represented by $P_1$ and the reaction at the point N tending to clockwise rotate the operating arm 41 is represented by $P_2$, the respective reactions $P_1$ and $P_2$ will be able to be represented as follows:

$$P_1 = \frac{T}{R_1},$$
$$P_2/\cos\theta = \frac{T}{R_2} \text{ and}$$
$$P_2 = \frac{T \cdot \cos\theta}{R_2}$$

In this case, if the reaction $P_2$ is larger than $P_1$, the spring 46 will act as a clockwise driving force on the driving arm 38 and operating arm 41 through the rocking lever 44. That is to say, it will be represented as follows:

$$P_2 - P_1 = \frac{T \cdot \cos\theta}{R_2} - \frac{T}{R_1}$$
$$= \frac{T(R_1 \cdot \cos\theta - R_2)}{R_1 \cdot R_2} > 0.$$

When $R_1 \cdot \cos\theta - R_2 > 0$, $P_2 > P_1$. Therefore, in seeing the state illustrated by the solid lines and the state illustrated by the chain lines, it is found that $\cos\theta$ is substantially constant, the longer $R_2$, the longer $R_1$ and therefore at least $R_2$ is set to be shorter than $R_1$.

Now, in the illustrated cocked state, when a releasing operation is made, the above mentioned control member not illustrated will push and move the arm part 47, the locking lever 47 will be rotated counterclockwise against the tension of the spring 49 and the bend 47b will be disengaged from the arm part 41a. As a result, the operating arm 41 will pull the driving arm 38 through the rocking lever 44 with the weak acting force of the reaction $P_2 - P_1$ of the spring 46, will rotate clockwise to the position which is illustrated by the chain lines and in which it is prevented by the pin 43 and will move the rear blade group 5 to the aperture opening position. When a proper exposure time elapses, the bend 51a will be pushed and moved, the closing release lever 51 will be rotated clockwise against the tension of the spring 53, the bend 51b will push and move the arm part 44b, the rocking lever 44 will be rotated counterclockwise against the tension of the spring 45 and the hook 44a will be disengaged from the pin 38b. Therefore, the driving arm 38 will be rotated counterclockwise to the position which is illustrated by the solid lines with the strong acting force of the reaction $P_1$ of the spring 46 and the rear blade group 5 will be moved to the aperture closing position.

When the shutter is cocked, the operating arm 41 will be rotated counterclockwise. In the course, the rocking lever 44 will be once rotated counterclockwise by the engagement with the pin 38b of the driving arm 38 on the cam surface 44c and then the shutter will be cocked as illustrated by the solid lines by the engagement of the hook 44a with said pin 38b.

In this embodiment, the rocking lever 44 is pivoted on the operating arm 41 but can be modified to be pivoted on the driving arm 38. It is also needless to say that the formation shown in this embodiment can be applied also to the front blade driving means by only changing the relative arrangement of the respective elements.

As described above, according to the embodiment shown in FIG. 6, as it is so formed that the driving force utilized in the case of moving the rear blade group to the aperture opening position may be weaker than the driving force utilized in the case of moving it to the aperture closing position, the shock produced in the case of moving the rear blade group from the aperture closing position to the aperture opening position will be very small and an ideal blade motion can be guaranteed.

I claim:

1. A focal plane shutter comprising an exposure aperture, a front blade group and rear blade group each of which consists of a plurality of opaque laminae and can move in the vertical direction between an exposure aperture covering position and an exposure aperture opening position, a front blade operating member which is operatively connected with said front blade group and can move said front blade group to said exposure aperture opening position and closing position, a front blade driving member which is engageable with said front blade operating member and can move said front blade group to said exposure aperture opening position through said front blade operating member, and a spring which is connected between said front blade operating member and front blade driving member to give independent driving forces to said front blade operating member and front blade driving member, said front blade group being returned to a position covering at least a part of said exposure aperture by said front blade operating member after the exposing operation.

2. A focal plane shutter according to claim 1 wherein said rear blade group is moved from said exposure aperture covering position to said exposure aperture opening position just before the shutter opening release.

3. A focal plane shutter according to claim 1 wherein said focal plane shutter further comprises a brake means engageable with said front blade operating member and front blade driving member and said front blade operating member and front blade driving member are braked by said brake means when said front blade operating member moves together with said front blade driving member to bring said front blade member to the opening position.

4. A focal plane shutter comprising an exposure aperture, a front blade group and rear blade group each of which consists of a plurality of opaque laminae and can move in the vertical direction between an exposure aperture covering position and an exposure aperture opening position, a rear blade operating member which is operatively connected with said rear blade group and can move said rear blade group to said exposure aperture closing position and opening position, a rear blade driving member which is engageable with said rear blade operating member and can move said rear blade group to said exposure aperture closing position through said rear blade operating member, and a spring which is connected between said rear blade operating member and rear blade driving member to give independent driving forces to said rear blade operating member and rear blade driving member, said front blade group being returned from said exposure aperture opening position to a position covering at least a part of said exposure aperture after the exposing operation and said rear blade group being moved from said exposure aperture covering position to said exposure aperture opening position by said rear blade operating member just before the shutter opening release.

5. A focal plane shutter according to claim 4 wherein said spring is a coil spring.

6. A focal plane shutter comprising an exposure aperture, a front blade group which consists of a plurality of opaque laminae and can move in the vertical direction between an exposure aperture covering position and an exposure aperture opening position and is moved to a position covering at least a part of said exposure aperture after the exposing operation, a rear blade group which consists of a plurality of opaque laminae and can move in the vertical direction between an exposure aperture covering position and an exposure aperture opening position and is moved from said exposure aperture covering position to said exposure aperture opening position just before the shutter opening release, a rotatable driving member which is operatively connected with said rear blade group and can move said rear blade group to said exposure aperture opening position and closing position, a rotatable operating member which is arranged adjacently to said driving member and has a pivot different from that of said driving member, a rocking member which is pivoted on either of said driving member and operating member and is engageable with the other of said driving member and operating member to connect said driving member and operating member with each other, and a spring which is connected between said driving member and operating member and is so arranged as to be able to give said operating member a resiliency weaker than to said driving member, said operating member being connected to said driving member holding said rear blade group in said exposure aperture covering position through said rocking member when the shutter is cocked, said operating member being unlocked to move said rear blade group to said exposure aperture opening position just before the shutter opening release and said driving member being disconnected from said operating member by said rocking member to move said rear blade group to said exposure aperture closing position when the exposure ends.

* * * * *